United States Patent
Cote et al.

(10) Patent No.: US 7,324,595 B2
(45) Date of Patent: *Jan. 29, 2008

(54) METHOD AND/OR APPARATUS FOR REDUCING THE COMPLEXITY OF NON-REFERENCE FRAME ENCODING USING SELECTIVE RECONSTRUCTION

(75) Inventors: Guy Cote, Elora (CA); Michael D. Gallant, Guelph (CA); Pavel Novotny, Waterloo (CA); Lowell L. Winger, Waterloo (CA)

(73) Assignee: LSI Logic Corporation, Milpitas, CA (US)

( * ) Notice: Subject to any disclaimer, the term of this patent is extended or adjusted under 35 U.S.C. 154(b) by 841 days.

This patent is subject to a terminal disclaimer.

(21) Appl. No.: 10/667,948

(22) Filed: Sep. 22, 2003

(65) Prior Publication Data
US 2005/0063465 A1 Mar. 24, 2005

(51) Int. Cl.
*H04N 7/12* (2006.01)
*G06K 9/36* (2006.01)
(52) U.S. Cl. .................................. 375/240.12; 382/238
(58) Field of Classification Search ........... 375/240.12, 375/240.13, 240.16, 240.15, 240.03, 240.24; 382/238
See application file for complete search history.

(56) References Cited

U.S. PATENT DOCUMENTS

| 5,657,086 | A  | * | 8/1997  | Tahara et al.       | 375/240.13 |
| 5,748,243 | A  | * | 5/1998  | Suzuki              | 375/240.03 |
| 6,647,061 | B1 | * | 11/2003 | Panusopone et al.   | 375/240.12 |
| 2004/0131121 | A1 | * | 7/2004 | Dumitras et al.    | 375/240.16 |
| 2004/0240549 | A1 | * | 12/2004 | Cote et al.        | 375/240.15 |
| 2007/0047648 | A1 | * | 3/2007  | Tourapis et al.    | 375/240.13 |

OTHER PUBLICATIONS

"Method and/or Apparatus for Reducing the Complexity of H.264 B-Frame Encoding using Selective Reconstruction", Cote et al., LSI Logic Corporation, U.S. Appl. No. 10/449,471, filed May 30, 2003.

* cited by examiner

*Primary Examiner*—Gims Philippe
(74) *Attorney, Agent, or Firm*—Christopher P. Maiorana (57) ABSTRACT

A method for implementing non-reference frame prediction in video compression comprising the steps of (A) setting a prediction flag (i) "off" if non-reference frames are used for block prediction and (ii) "on" if non-reference frames are not used for block prediction, (B) if the prediction flag is off, generating an output video signal in response to an input video signal by performing an inverse quantization step and an inverse transform step in accordance with a predefined coding specification and (C) if the prediction flag is on, bypassing the inverse quantization step and the inverse transform step.

20 Claims, 6 Drawing Sheets

METHOD AND/OR APPARATUS FOR REDUCING THE COMPLEXITY OF NON-REFERENCE FRAME ENCODING USING SELECTIVE RECONSTRUCTION

CROSS REFERENCE TO RELATED APPLICATIONS

The present application may relate to co-pending application Ser. No. 10/449,471, filed May 30, 2003, which is hereby incorporated by reference in its entirety.

FIELD OF THE INVENTION

The present invention relates to digital video generally and, more particularly, to a method and apparatus for reducing the complexity of non-reference frame encoding using selective reconstruction.

BACKGROUND OF THE INVENTION

Digital video compression standards attempt to provide efficient solutions to transfer video. Digital video compression technology reduces the statistical redundancy, perceptual point of view information irrelevancy, and high level features that are redundant across space and time in a source video signal. Compression is represented as compressed frames, where a frame is a snapshot in time. Conventional frames can be of I, P, or B type. I-frames are intra-picture frames compressed using intra-frame coding. P-frames are predicted-picture frames coded using motion-compensated prediction from previously encoded I-frames or P-frames. B-frames are bi-directional predicted picture frames using motion-compensated prediction from previously encoded and/or future encoded I-frames or P-frames. B-frames provide the most compression.

Several successful standards have emerged (e.g., (i) ITU-T H.261: "Video Codec for Audiovisual Services at p×64 kbit/s", Geneve 1990, ITU-T, (ii) H.263: "Video Coding for Low Bitrate Communication", Geneve 1996, (iii) ISO/IEC MPEG-1 11172-2:1993 Information Technology—Coding of Moving Pictures and Associated Audio for digital storage media at up to 1.5 Mbits/s. Part2, (iv) MPEG-2 ISO/IEC 13818-2:2000 Information Technology—Generic Coding of Moving Pictures and Associated Audio Information. Part2: Video and (v) MPEG-4 ISO/IEC 14496-2:2001 Information Technology—Coding of audio-visual objects. Part 2: Visual), each of which is incorporated by reference in its entirety. These standards address a wide range of applications having different needs in terms of bit rate, picture quality, complexity, error resilience and delay, as well as improved compression ratios.

MPEG-2 encoding has been a key technology used in conventional digital video compression. MPEG-2 does not use B-frames for prediction of other pictures. H.264 encoding provides quality equivalent to MPEG-2, but uses lower bit rates. Alternately, H.264 encoding can provide an improved quality using the same bit rate. However, H.264 encoding is more complex and uses more processing than MPEG-2 encoding. H.264 sometimes uses B-frames for prediction.

The computational needs of conventional digital video encoding compression are extremely high. Compression of digital video without significant quality degradation is usually possible because video sequences contain a high degree of 1) spatial redundancy (due to the correlation between neighboring pixels), 2) spectral redundancy (due to correlation among the color components), 3) temporal redundancy (due to correlation between video frames) and 4) psycho-visual redundancy (due to properties of the human visual system (HVS)).

In conventional video compression standards, since B-frames are not used as reference frames for video compression, the reconstruction process of B-frame encoding may be skipped. Avoiding such reconstruction significantly reduces the computational burden. However, because of various intra-picture prediction modes present in H.264, the reconstruction of B-frames cannot merely be skipped. Therefore, conventional solutions used in MPEG-2 cannot be applied to MPEG-4 Part 10.

It would be desirable to implement a method and/or apparatus to reduce the complexity of video encoding of digital video bitstreams, such as MPEG-4 part 10 compliant bitstreams.

SUMMARY OF THE INVENTION

The present invention concerns a method for implementing non-reference frame prediction in video compression comprising the steps of (A) setting a prediction flag (i) "off" if non-reference frames are used for block prediction and (ii) "on" if non-reference frames are not used for block prediction, (B) if the prediction flag is off, generating an output video signal in response to an input video signal by performing an inverse quantization step and an inverse transform step in accordance with a predefined coding specification and (C) if the prediction flag is on, bypassing the inverse quantization step and the inverse transform step.

The objects, features and advantages of the present invention include providing digital video system that may (i) skip the deblocking filter stage, (ii) keep track of macroblock modes and selective reconstruction macroblock that are used for intra prediction, (iii) select a constrained intra prediction mode, and/or (iv) use a constrained intra prediction flag as an indication to reconstruct only I-coded macroblocks in a non-reference frame. The present invention may also (i) improve encoding performance, (ii) reduce the complexity of implementation and (iii) reduce computation and memory use without compromising H.264 syntax compliance or operability with H.264 decoders.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
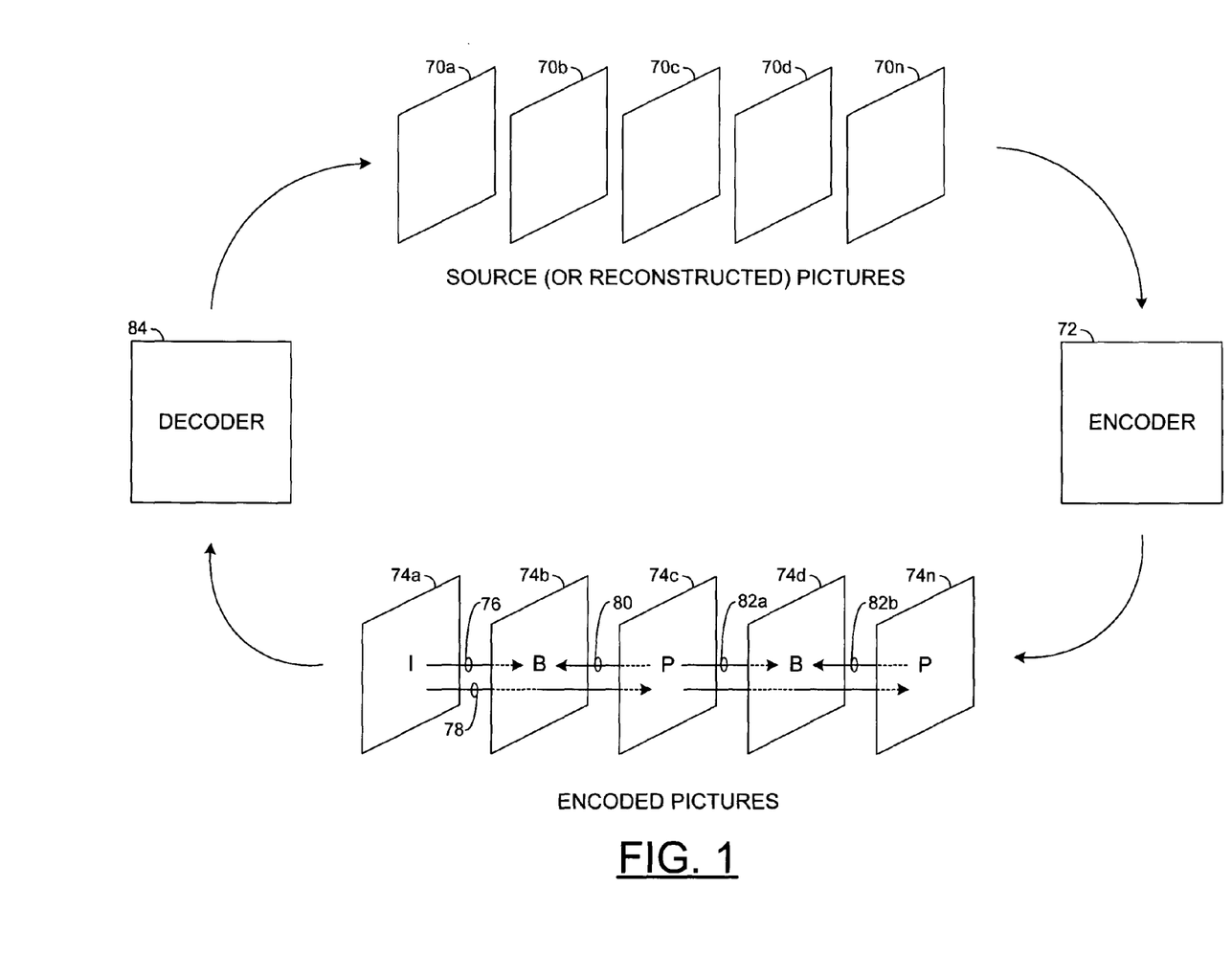
FIG. 1 is a block diagram illustrating encoding and decoding operations.

Referring to FIG. 1, a block diagram is shown illustrating encoding and decoding operations. In general, a data stream (e.g., a video stream) may comprise a series of source pictures 70*a*-*n*. The source pictures may also be referred to as images, frames, a group-of-pictures (GOP) or a sequence. The pictures generally comprise contiguous rectangular arrays of pixels (i.e., picture elements). Compression of digital video without significant quality degradation is usually possible because video sequences contain a high degree of: 1) spatial redundancy, due to the correlation between neighboring pixels, 2) spectral redundancy, due to correlation among the color components, 3) temporal redundancy, due to correlation between video frames, and 4) psychovisual redundancy, due to properties of the human visual system (HVS).

Video frames generally comprise three rectangular matrices of pixel data representing a luminance signal (e.g., luma Y) and two chrominance signals (e.g., chroma Cb and Cr) that correspond to a decomposed representation of the three primary colors (e.g., Red, Green and Blue) associated with each picture element. The most common format used in video compression standards is eight bits and 4:2:0 sub-sampling (e.g., the two chroma components are reduced to one-half the vertical and horizontal resolution of the luma component). However, other formats may be implemented to meet the design criteria of a particular application.

Each picture may comprise a complete frame of video (e.g., a frame picture) or one of two interlaced fields from an interlaced source (e.g., a field picture). The field picture generally does not have any blank lines between the active lines of pixels. For example, if the field picture is viewed on a normal display, the field picture would appear short and fat. For interlaced sequences, the two fields may be encoded together as a frame picture. Alternatively, the two fields may be encoded separately as two field pictures. Both frame pictures and field pictures may be used together in a single interlaced sequence. High detail and limited motion generally favors frame picture encoding. In general, field pictures occur in pairs (e.g., top/bottom, odd/even, field1/field2). The output of a decoding process for an interlaced sequence is generally a series of reconstructed fields. For progressive scanned sequences, all pictures in the sequence are frame pictures. The output of a decoding process for a progressive sequence is generally a series of reconstructed frames.

The source pictures 70*a*-*n* may be presented to an encoder 72. The encoder 72 may be configured to generate a series of encoded pictures 74*a*-*n* in response to the source pictures 70*a*-*n*, respectively. For example, the encoder 72 may be configured to generate the encoded pictures 74*a*-*n* using a compression standard (e.g., MPEG-2, MPEG-4, H.264, etc.). In general, encoded pictures may be classified as intra coded pictures (I), predicted pictures (P) and bi-predictive pictures (B). Intra coded pictures are generally coded without temporal prediction. Rather, intra coded pictures use spatial prediction within the same picture. For example, an intra coded picture is generally coded using information within the corresponding source picture (e.g., compression using spatial redundancy). An intra coded picture is generally used to provide a receiver with a starting point or reference for prediction. In one example, intra coded pictures may be used after a channel change and to recover from errors.

Predicted pictures (e.g., P-pictures or P-frames) and bi-predictive pictures (e.g., B-pictures or B-frames) may be referred to as inter coded. Inter coding techniques are generally applied for motion estimation and/or motion compensation (e.g., compression using temporal redundancy). P-pictures and B-pictures may be coded with forward prediction from references comprising previous I and P pictures. For example, the B-picture 74*b* and the P-picture 74*c* may be predicted using the I-picture 74*a* (e.g., as indicated by the arrows 76 and 78, respectively). The B-pictures may also be coded with (i) backward prediction from a next I or P-reference picture (e.g., the arrow 80) or (ii) interpolated prediction from both past and future I or P-references (e.g., the arrows 82*a* and 82*b*, respectively). However, portions of P and B-pictures may also be intra coded or skipped (e.g., not sent at all). When a portion of a picture is skipped, the decoder generally uses the associated reference picture to reconstruct the skipped portion with no error.

However, the concept of what particular pictures may reference what other particular pictures may be generalized in a particular compression standard (e.g., H.264). For example, P-pictures may reference temporally forward or backward. B-pictures may have similar forward or backward references. The restriction is generally not time, but rather how many frames are stored in a buffer so that the frames may be decoded in a different order than the frames are displayed. In one example, the frames may be referenced forward in time. In another example, the frames may be referenced backward in time (e.g., re-ordering the frames). In an H.264 implementation, I-frames, P-frames and B-frames can all be non-reference frames.

In one example, a B-frame may differ from a P-frame in that a B-frame may do interpolated prediction from any two reference frames. Both reference frames may be (i) forward in time, (ii) backward in time, or (iii) one in each direction. B-pictures can be, and are expected to often be, used as prediction references in H.264. In many cases an important distinction is between reference and non-reference frames.

The encoded pictures 74*a*-*n* may be presented to a decoder 84. The decoder 84 is generally configured to generate a series of reconstructed pictures corresponding to the source pictures 70*a*-70*n* (e.g., images, frames, fields, etc.) in response to the encoded pictures. In one example, the decoder 84 may be implemented within the encoder 72 and the reconstructed pictures may be used in the prediction operations of the encoding process.

Figure 2:
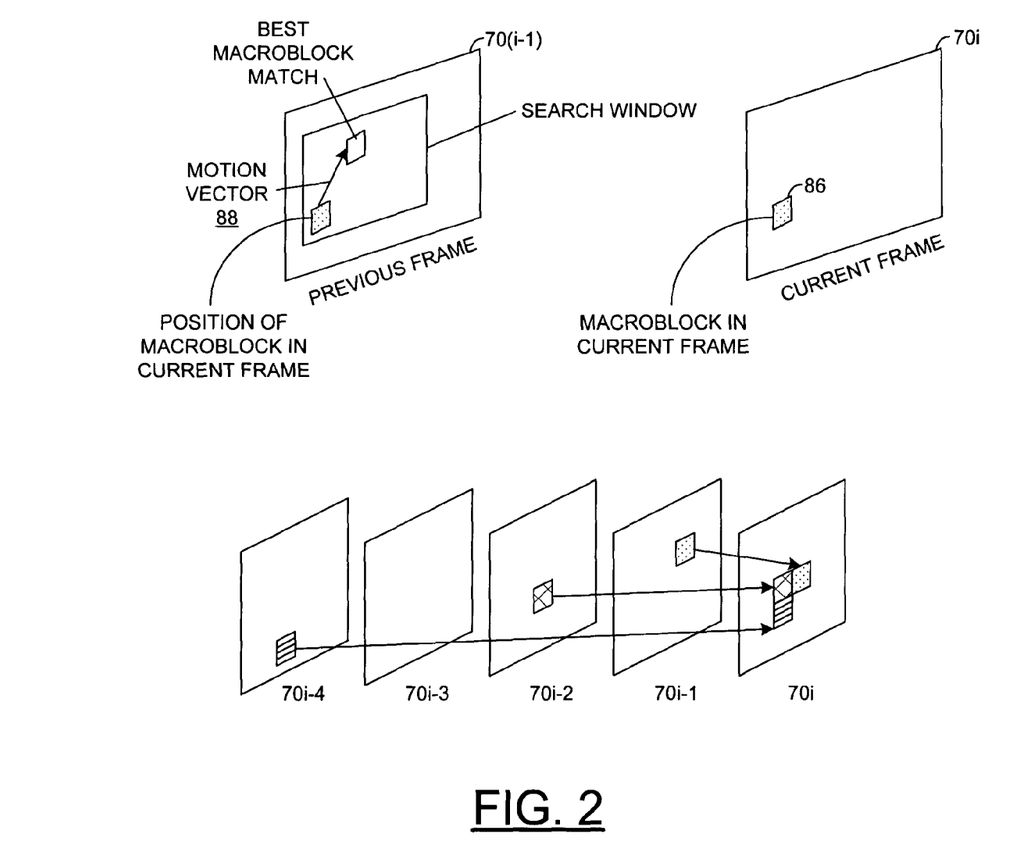
FIG. 2 is a block diagram illustrating example prediction operations.

Referring to FIG. 2, a block diagram is shown illustrating example prediction operations. A picture (or video frame) 70*i* may be divided into a number of macroblocks 86 of equal size. In one example, the macroblocks 86 may be implemented as 16×16 pixels. However, other size macroblocks may be implemented to meet the design criteria of a particular application. Motion compensated prediction generally presumes that a macroblock within the current picture 70*i* may be modeled as a translation of a macroblock from a previous picture 70(i−1). Each macroblock 86 in the current picture 70*i* is generally predicted from the previous picture 70(i−1). The motion information is generally represented as a two-dimensional displacement vector or motion vector 88. Due to the block-based picture representation, motion estimation generally uses block-matching techniques that obtain the motion vector by minimizing a cost function measuring the mismatch between a candidate block and the current block. In one example, a number of previous (or reference) pictures 70(i−4), 70(i−3) . . . 70(i−1) may be used to predict the macroblocks in the current picture 70*i*.

Figure 3:
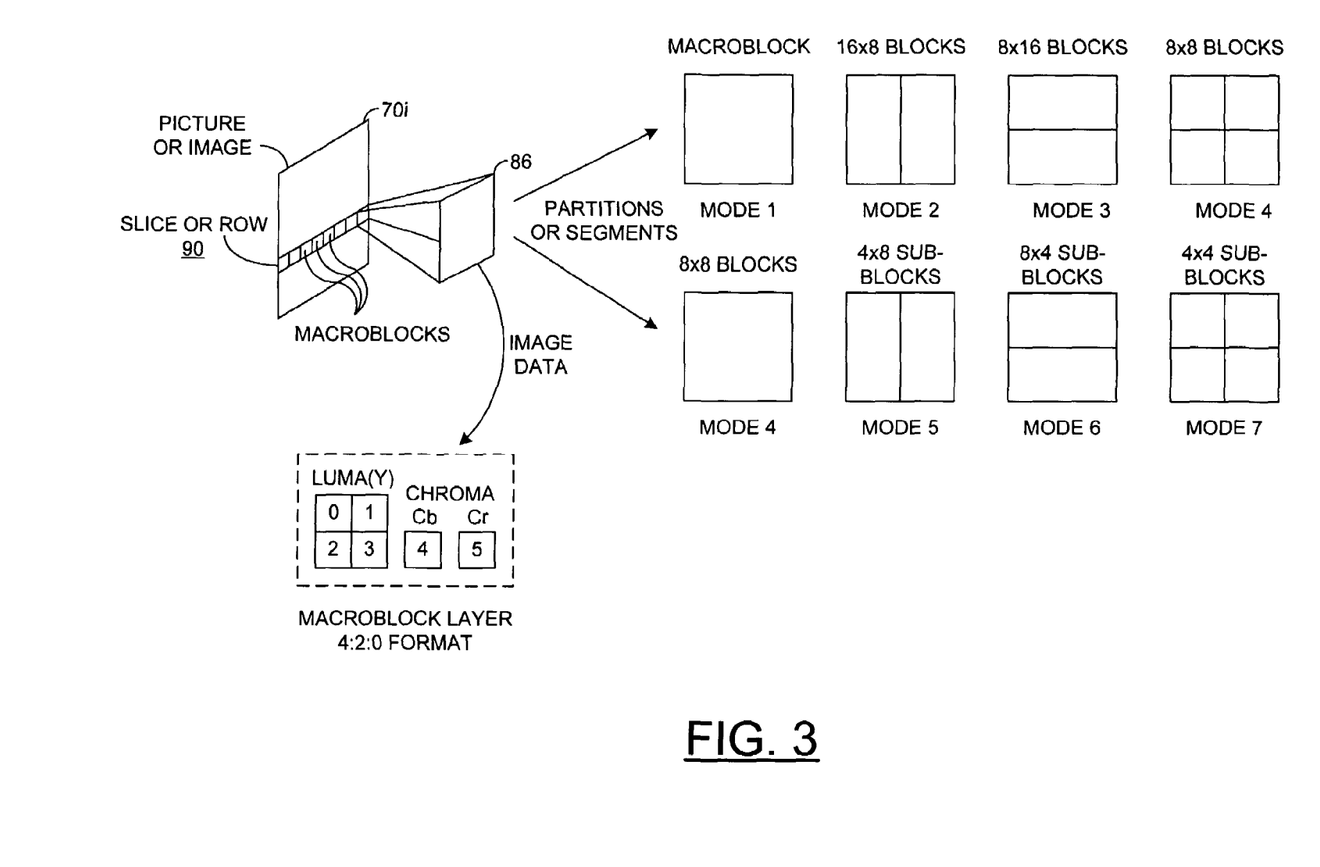
FIG. 3 is a block diagram illustrating partitions or segments of pictures.

Referring to FIG. 3, a block diagram is shown generally illustrating partitions or segments of pictures. In general, a picture (e.g., an image, a frame, a field, etc.) 70*i* may be divided (e.g., segmented, partitioned, etc.) into a number of macroblocks 86. The macroblocks generally comprise an array of pixels having vertical and horizontal dimensions of equal size (e.g., 32×32, 16×16, etc). The macroblocks generally comprise luminance data (e.g., luma Y) and chrominance data (e.g., blue chroma Cb and red chroma Cr). In one example, the luminance data may have a resolution that is twice that of the chrominance data (e.g., a 4:2:0 format).

The macroblocks 86 may be grouped in a number of slices 90. The slices 90 may comprise an arbitrary number of macroblocks 86. The slices 90 generally run from left to right and may comprise an entire row of the picture 70i. However, a slice 90 may comprise less than or more than an entire row of macroblocks 86 (e.g., H.264 compliant). In one example, a slice 90 may be defined as a particular number of macroblocks 86 grouped together. For broadcast profiles, the macroblocks 86 in a slice 90 are generally consecutive macroblocks in raster scan order. However, for streaming and/or video-conferencing applications, a map may be sent identifying which scattered macroblocks are grouped together in a slice. A compression standard (e.g., H.264) may also provide an option of using macroblocks or macroblock pairs. A macroblock pair comprises two macroblocks located one above the other. When macroblock pairs are used, a slice or row generally comprises macroblock pairs rather than macroblocks.

In one example, the macroblock 86 may be implemented as a 16×16 block. The macroblock 86 may be encoded in an inter prediction mode (e.g., compression based upon temporal redundancy) or an intra prediction mode (e.g., compression based upon spatial redundancy). In the inter prediction mode, each 16×16 macroblock 86 may be predicted with a single 16×16 vector (e.g., mode 1). Alternatively, the macroblock 86 may be segmented into two 16×8 blocks (e.g., mode 2) or two 8×16 blocks (e.g., mode 3), in which case two motion vectors may be generated for predicting the macroblock 86. The macroblock 86 may also be segmented into four 8×8 blocks (e.g., mode 4), in which case four motion vectors may be generated for the macroblock 86. When the macroblock 86 is segmented into the four 8×8 blocks (e.g., mode 4), each 8×8 block may be optionally further segmented into two 4×8 sub-blocks (e.g., mode 5), two 8×4 sub-blocks (e.g., mode 6) or four 4×4 sub-blocks (e.g., mode 7). An encoder generally decides which "mode" to use for encoding each macroblock 86. For example, an error score may be computed based on a closeness of match determination for each mode, with the modes that use more vectors being penalized (e.g., by increasing the respective error score) because of the additional bits that it will take to encode the motion vectors.

For chrominance (or chroma) samples, the prediction block is generally formed for the entire 8×8 chroma block. Both chroma Cb and chroma Cr blocks are generally processed similarly. In general, one of four prediction modes may be used (e.g., DC or mode 0, vertical or mode 1, horizontal or mode 2, and plane or mode 3).

H.264 defines an encoding syntax along with a method to decode. The present invention may be used for encoding, while maintaining H.264 decoder syntax compliance, but may reduce the complexity of the encoding process. In particular, the present invention may reduce complexity in non-reference frame processing when the non-reference frames are not used in prediction.

A coding mode where temporal prediction is used is generally referred to as an "inter" mode. The inter mode is generally selected if the motion compensation process is effective, and only if a prediction error macroblock (e.g., the difference between the original macroblock and the motion compensated predicted macroblock) needs to be encoded. A coding mode where temporal prediction is not used, is generally referred to as an "intra" mode. The selection between modes is generally made at the macroblock level. The performance of the motion estimation process, often measured in terms of the associated distortion values, may be used to select the coding mode.

Figure 4:
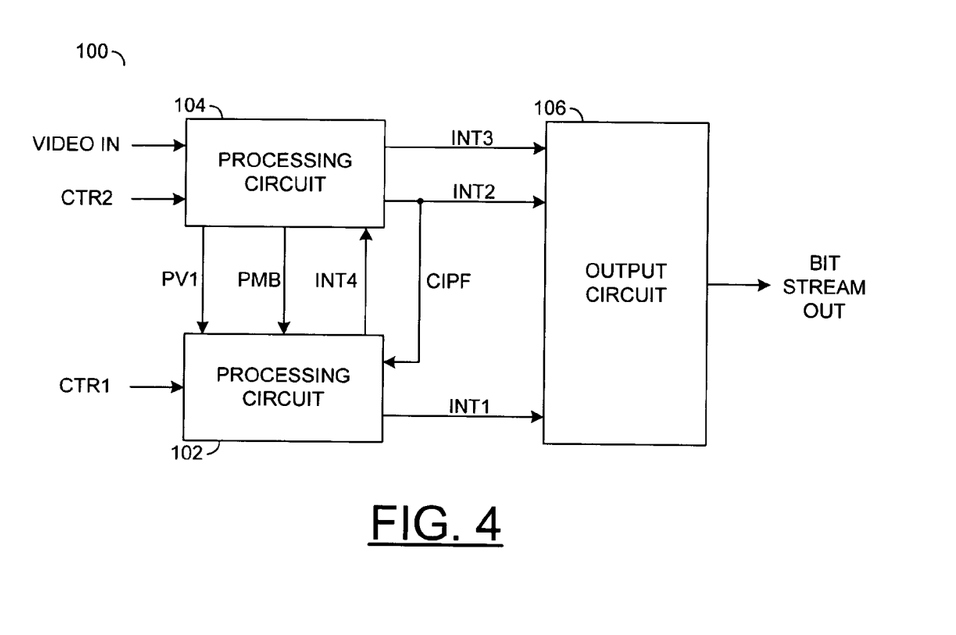
FIG. 4 is a block diagram of a preferred embodiment of the present invention.

Referring to FIG. 4, a diagram of a system 100 is shown illustrating a preferred embodiment of the present invention. The system 100 generally comprises a processing block (or circuit) 102, a processing block (or circuit) 104 and an output block (or circuit) 106. The output circuit 106 may be implemented as an entropy coding block. The various components of the present invention are described as blocks and/or circuits. However, the various components may be implemented in hardware, software or a combination of hardware and software. Software may be used to describe firmware, VHDL code, etc.

The entropy coding block 106 may generate an output video bitstream (e.g., OUT) in response to an intermediate signal (e.g., INT1), an intermediate signal (e.g., INT2) and an intermediate signal (e.g., INT3). The processing circuit 102 may generate the signal INT1 in response to a processed video signal (e.g., PV1). The signal PV1 may be generated by the processing circuit 104. The processing circuit 102 may also generate a signal (e.g., INT4) and may receive a signal (e.g., PMB). The signal PMB may be referred to as a prediction (or predictor) macroblock that may be received from the processing block 104. The prediction macroblock PMB may be used by the processing circuit 102. The processing circuit 104 may generate the signal INT2, the signal INT3, the signal PV1 and the signal PMB in response to the signal INT4 and an input video signal (e.g., VIDEO_IN). One bit of the signal INT3 may be presented as a flag (e.g., CIPF). The flag CIPF may represent a constrained intra prediction flag (to be discussed in more detail in connection with FIGS. 5 and 6). The processing circuit 102 may also receive a control signal (e.g., CTR1). Similarly, the processing circuit 104 may receive a control signal (e.g., CTR2).

Figure 5:
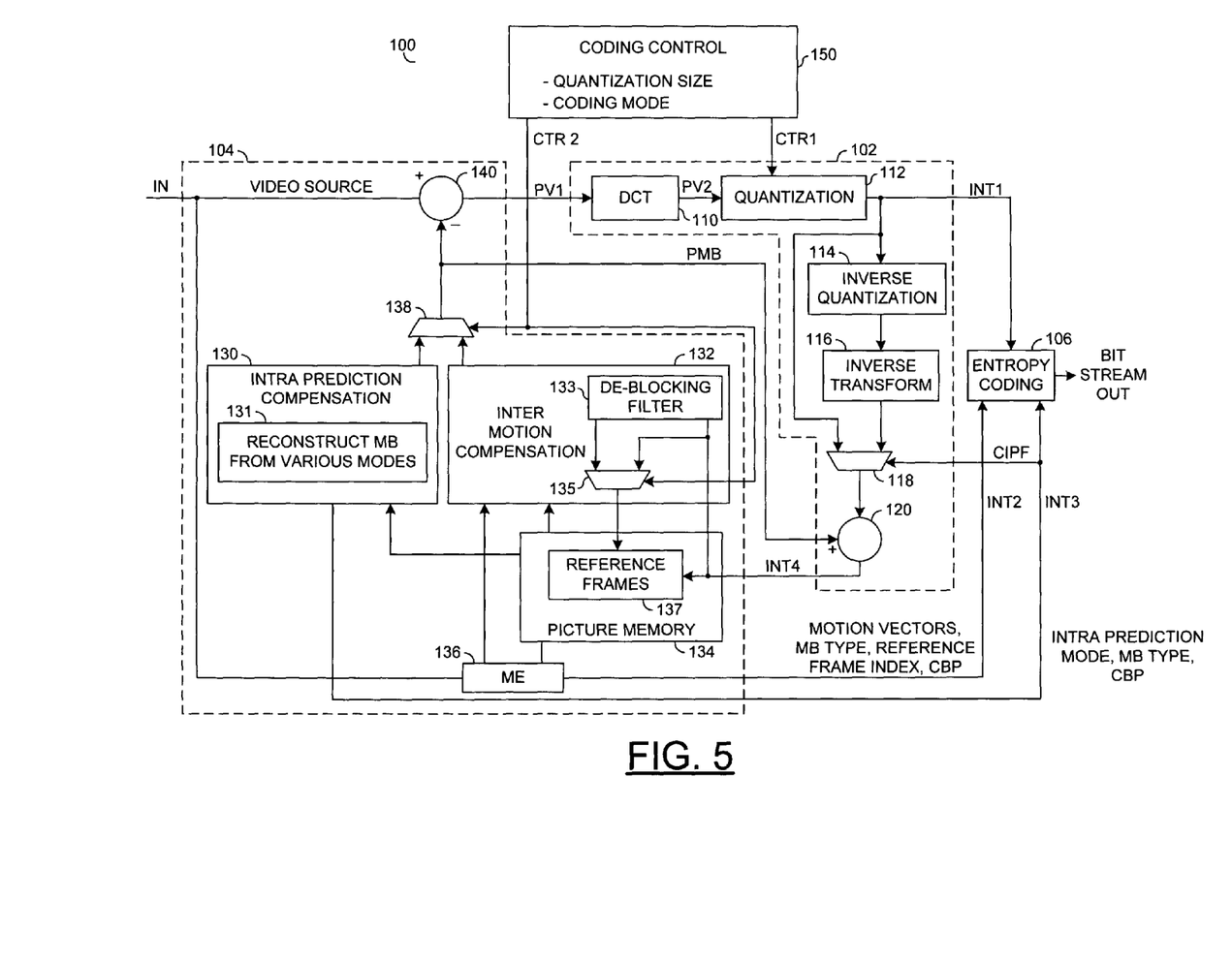
FIG. 5 is a more detailed diagram of the system of FIG. 4.

Referring to FIG. 5, a more detailed diagram of the system 100 is shown. The system 100 is shown including a control block (or circuit) 150. The control block 150 may be implemented as a coding control block. The block 150 may present the control signals CTR1 and CTR2. The control signals CTR1 and CTR2 may control one or more parameters such as quantization size and/or coding mode.

The processing circuit 102 generally comprises a block (or circuit) 110, a block (or circuit) 112, a block (or circuit) 114, a block (or circuit) 116, a block (or circuit) 118 and a block (or circuit) 120. The block 110 may be implemented as a discrete cosine transform circuit. The block 112 may be implemented as a quantization circuit. The block 114 may be implemented as an inverse quantization circuit. The inverse quantization circuit 114 may be used to reverse the quantization process previously performed on the data set (e.g., the signal PV2) by the circuit 112. The inverse quantization circuit 114 generally builds a matrix of values used by the block 116. The block 116 may be implemented as an inverse transform circuit. The inverse transform circuit 116 generally reverses the DCT process that was performed by the block 110, transforming the data set to the spatial domain. The inverse transform circuit may also be referred to as an inverse DCT block or an IDCT block.

The block 118 may be implemented as a multiplexer, such as a 2-1 multiplexer. The block 118 may be used for selecting between (i) a first path that includes the inverse quantization block 114 and the inverse transform block 116 or (ii) a second mode that bypasses the block 114 and the block 116. The block 120 may be implemented as a summing block. The block 120 may add the output of the block 120 with the predictor macroblock PMB.

The processing block 104 generally comprises a block (or circuit) 130, a block (or circuit) 132, a block (or circuit) 134, a block (or circuit) 136, a block (or circuit) 138 and a block (or circuit) 140. The circuit 130 may be implemented as an intra prediction compensation circuit. The circuit 130 may include a block 131. The block 131 may reconstruct macroblocks from the various modes. The circuit 132 may be implemented as an inter motion compensation circuit. The circuit 132 may also include a block (or circuit) 133 and a block (or circuit) 135. The block 133 may be implemented as a de-blocking filter. The circuit 135 may be implemented as a multiplexer, such as a 2-1 multiplexer. The circuit 135 may select between an output of the de-blocking filter 133 and a bypass of the de-blocking filter 133. The circuit 134 may be implemented as a picture memory circuit. The circuit 134 may include a block (or circuit) 137. The block 137 may be implemented to store one or more reference frames. The circuit 136 may be implemented as a motion estimation circuit. The circuit 138 may be implemented as a multiplexer, such as a 2-1 multiplexer. The circuit 140 may be implemented as a subtractor circuit. The circuit 140 generally subtracts the predicted macroblock PMB from the input video signal IN to generate the signal PV1.

The intermediate signal INT2 may contain one or more control signals. The control signals may include motion vectors, macroblock type, reference frame index, coded block pattern (CPB) information, etc. The intermediate signal INT3 may contain one or more control signals. The control signals may include intra prediction mode information, macroblock type, CPB, etc. One of the control signals contained in the signal INT3 may be the constrained intra prediction flag (CIPF). The flag CIPF may be used to determine if certain stages of the system 100 may be bypassed.

Figure 6:
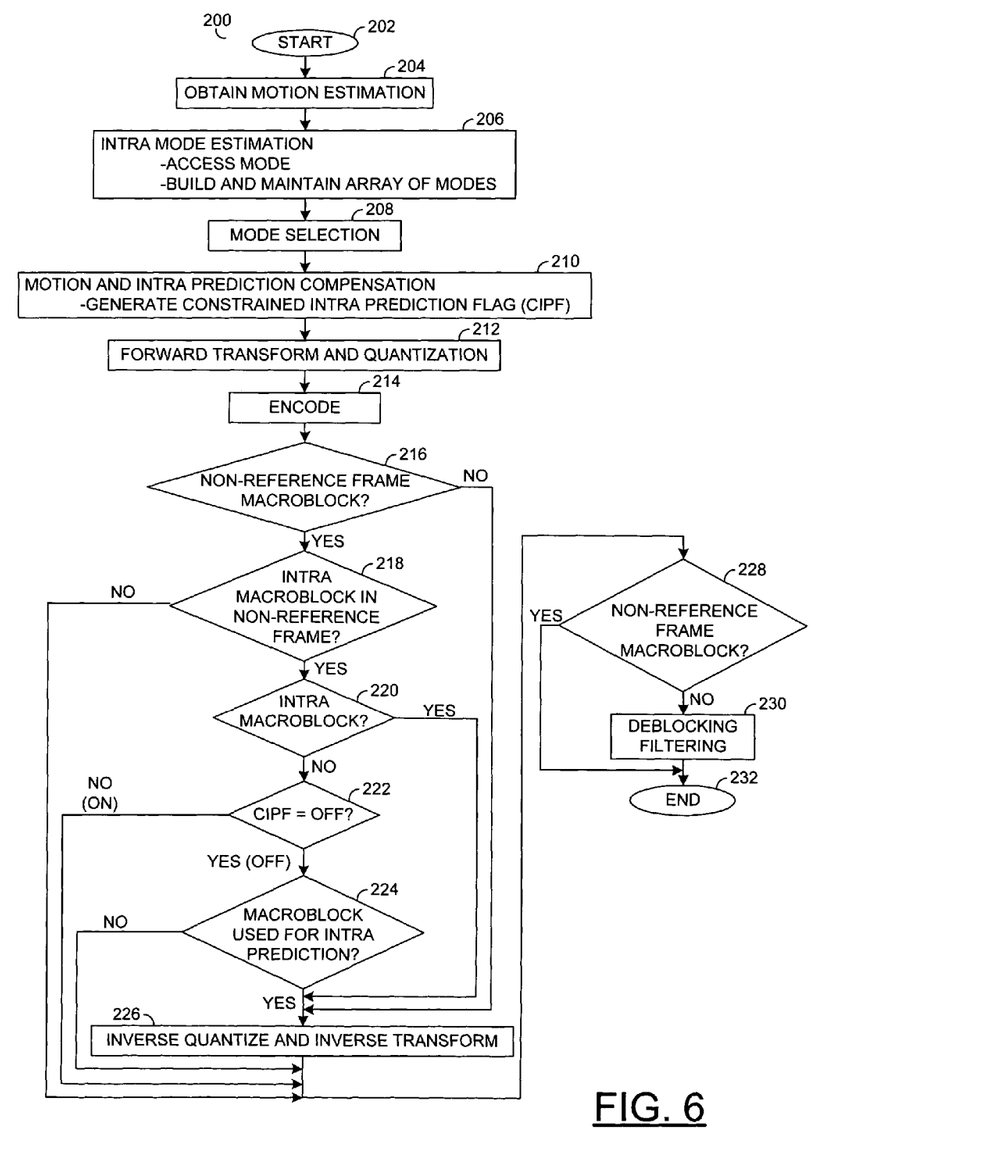
FIG. 6 is a flow diagram of the present invention.

Referring to FIG. 6, a diagram of a method or process 200 is shown in accordance with a preferred embodiment of the present invention. The method 200 generally comprises a state 202, a state 204, a state 206, a decision state 208, a state 210, a state 212, a state 214, a decision state 216, a decision state 218, a decision state 220, a decision state 222, a decision state 224, a state 226, a decision state 228, a state 230 and a state 232. The state 202 generally starts the method 200. The state 204 may obtain motion estimation information. The motion estimation information may be obtained using the block 136. The state 206 generally performs intra mode estimation. The state 206 may (i) determine the macroblock mode and (ii) build a link chain in an array storing the previous macroblock. The state 206 may be implemented in the circuit 130.

The state 208 generally selects a mode of operation. The state 208 may be implemented in the circuit 130. The state 210 generally provides motion and intra prediction compensation to generate the constrained intra prediction flag CIPF. The state 210 may also provide reconstruction of a previous macroblock, if needed for additional processing when the system is in the intra mode. The state 210 may be implemented in the circuit 130. The state 212 generally performs forward transform and quantization. The state 212 may be implemented in the circuits 110 and 112. The state 214 generally performs encoding. Encoding may be performed by the circuit 106.

The state 216 generally determines if a non-reference frame macroblock is present. If not, the method 200 moves to the state 226. If a non-reference frame is present, the method 200 moves to the state 218. The decision state 218 determines if intra macroblocks are needed for non-reference decoding. If so, the method 200 moves to the decision state 220. If not, the method 200 moves to the decision state 228. The decision state 220 determines if intra macroblocks are present. If so, the method 200 moves to the state 226. If not, the method 200 moves to the decision state 222. The decision state 222 determines if the flag CIPF is on or off. If the flag CIPF is off, the method 200 moves to the decision state 224. If the flag CIPF is on, the method 200 moves directly to the decision state 228. The decision state 224 determines if the macroblock is used for intra prediction. If so, the method 200 moves to the state 226. If not, the method 200 moves to the decision state 228. The state 226 performs inverse quantization and inverse transform operations. The state 226 may be implemented in the circuit 114 and the circuit 116.

The state 228 determines if a non-reference frame macroblock is present. If a non-reference frame macroblock is present, the method 200 moves to the state 232 and the method 200 ends. If a non-reference frame macroblock is not present, the method 200 moves to the state 230. The state 230 performs deblocking filtering. The state 236 may be implemented inside the block 132. In one example, the system 100 may be implemented without using intra macroblocks in non-reference frame processing. With such an implementation, the flag CIPF may not need to be checked.

In one example, a macroblock may be defined as 16×16 pixels of a source image datastream to be compressed. However, other sizes of macroblocks may be implemented to meet the design criteria of a particular implementation.

An H.264 compliant system has each macroblock encoded in either the intra mode or the inter mode. The intra mode generally involves processing macroblocks within a picture. In the intra mode, digital video may be processed spatially. In the intra mode, the processing of the space involves a current time snapshot of the picture. The inter mode generally involves processing macroblocks relative to reference pictures. In the inter mode, digital video may be processed temporally. In the inter mode, the space of multiple time snapshot pictures may be processed. In either mode, the predictor macroblock PMB is generated based on a reconstructed frame. In the intra mode, the predictor macroblock PMB may be generated from samples in the current frame that have previously gone through the encode, decode and reconstruction process. In the inter mode, the macroblock PMB is generated by motion compensation prediction from reference frames. The predictor macroblock PMB is subtracted from the currently processed macroblock to generate a difference macroblock (e.g., PV1 in FIG. 4). The difference macroblock PV1 is generally transformed using the DCT circuit 110 to generate a signal (e.g., PV2 in FIG. 4). The signal PV2 is generally quantized to produce the intermediate signal INT1, which may contain quantized transform coefficients. The entropy coding output circuit 106 generally re-orders the quantized transform coefficients to be encoded. The coding circuit 106 may provide lossless encoding. The entropy coding output circuit 106 (along with the macroblock prediction mode, the quantizer step size, and the motion vector information) may present an H.264 syntax compliant compressed bitstream OUT.

When the flag CIPF is a 0, the intra mode prediction allows the use of neighboring intra inter frame macroblock residual data. The decoded samples may be used for the prediction of intra frame macroblocks. When the flag CIPF is a 1, the constrained intra mode prediction uses residual data and decoded samples from I macroblock types only. The flag CIPF is generally related to motion and intra mode prediction compensation. The signal PMB generally comprises the entire predicted macroblock values used at the block 120. The predicted macroblock values PMB generally represent a result of the collective processing of the circuits 130, 132, 134, 136 and 138. The flag CIPF is typically implemented as a register bit that may be set during encoding and is sent to the Entropy Coding via INT3.

H.264 frame reconstruction occurs when the quantized macroblock coefficients are decoded. The coefficients are processed by the inverse quantization circuit 114 and the inverse transform circuit 116. The quantization generally reduces the precision, generating some loss. The signal PMB is added to the output of the circuit 118 to create the intermediate signal INT4, a reconstructed macroblock. The de-blocking filter 133 may be implemented to reduce the effects of the block boundary on encoding.

The video source signal IN is generally presented to the block 140 as well as the motion estimation block 136. The DCT circuit 110 presents a frequency based signal (e.g., PV2) to the quantization circuit 112. The quantization circuit 112 presents the signal INT1 to (i) the inverse quantization circuit 114, (ii) the entropy encoding circuit 106 and (iii) the bypass multiplexer 118. The multiplexer 118 generally presents the signal INT1 (e.g., bypassing the circuit 114 and the circuit 116) when the current macroblock is not used for intra mode non-reference frame processing.

The motion estimation circuit 136 processes the signal VIDEO_IN with the picture memory circuit 134 to produce motion estimation information for the inter motion compensation circuit 132 and the entropy coding circuit 106. The intra prediction motion compensation circuit 130 receives information from the picture memory 134. The intra prediction and motion compensation circuit 130 may use the reconstruction circuit 131 to selectively reconstruct macroblocks on an as needed basis.

The de-blocking filter 133 may be implemented to remove blocking artifacts that may be introduced by block prediction errors. The de-blocking filter 133 generally operates on the horizontal and vertical block edges within the predictive loop.

During the estimation and mode decision stage of the system 100, an array indicating the macroblock modes for every macroblock in a frame is maintained. The reconstruction stage for a macroblock is only performed if neighboring macroblocks need to reference reconstructed pixels for the intra prediction mode. The number of macroblocks to be reconstructed may further be reduced by using the flag CIPF from the MPEG-4 Part 10 specification. The prediction of intra mode macroblocks use pixels of neighbor intra-coded macroblocks. Therefore, only I-frame macroblocks may need to be reconstructed for B-frame processing.

In the second method, the deblocking filter step of the reconstruction is skipped entirely. In particular, inter-picture prediction is performed from reconstructed frames that have been filtered by the deblocking filter 133. However, non-reference frames are not used for temporal prediction. Also, intra mode prediction is performed using prediction pixels before the deblocking filter is applied. Therefore, it is possible to skip the deblocking filter 132 step for non-reference frames.

The present invention may (i) reduce the complexity of MPEG-4 Part 10 encoding, (ii) use MPEG-4 Part 10 syntax to further reduce encoder complexity, (iii) be implemented in software, and in programmable hardware platforms, (iv) be applied to previous and future video compression standards, (v) be used in a video encoder, transrater, transcoder, and/or statmux system, (vi) produce a bit stream that can be stored, transmitted, or used internal to a system.

While the invention has been particularly shown and described with reference to the preferred embodiments thereof, it will be understood by those skilled in the art that various changes in form and details may be made without departing from the spirit and scope of the invention.

The invention claimed is:

1. A method for implementing non-reference frame prediction in video compression comprising the steps of:
   - (A) setting a prediction flag (i) off if non-reference frames are used for block prediction and (ii) on if non-reference frames are not used for block prediction;
   - (B) if said prediction flag is off, generating an output video signal in response to an input video signal by performing an inverse quantization step and an inverse transform step in accordance with a predefined coding specification; and
   - (C) if said prediction flag is on, generating said output video signal while bypassing said inverse quantization step and said inverse transform step.

2. The method according to claim 1, wherein said input video signal comprises a series of macroblocks.

3. The method according to claim 2, wherein said method operates (i) in a first mode if said prediction flag is on and (ii) a second mode if said prediction flag is off.

4. The method according to claim 3, wherein (i) said first mode comprises an intra prediction mode and (ii) said second mode comprises an inter prediction mode.

5. The method according to claim 4, wherein said inter prediction mode uses information from a previous one of said macroblocks to encode a subsequent one of said macroblocks.

6. The method according to claim 2, further comprising the steps of:
   - generating an array configured to store which of said modes was used to encode each of said macroblocks; and
   - if said mode information is needed to encode a macroblock, reconstructing the mode used macroblock from the array information.

7. The method according to claim 1, wherein said method reduces complexity on non-reference frame macroblock encoding when non-reference frames are not used for prediction.

8. The method according to claim 1, wherein said output video signal comprises an H.264 compliant encoded bitstream.

9. The method according to claim 1, further comprising the step of:
   - reconstructing an I-frame macroblock if said prediction flag is on.

10. The method according to claim 9, further comprising the step of:
    - skipping said reconstruction step if said prediction flag is off.

11. The method according to claim 1, wherein said prediction flag comprises a constrained intra prediction (CIPF) flag.

12. The method according to claim 1, wherein said method (i) executes a deblocking filtering stage when in a first mode and (ii) skips said deblocking filtering stage when in a second mode.

13. The method according to claim 1, further comprising the step of:
- (D) forcing a decoder to not use intra macroblocks in non-reference frame processing; and
- (E) skipping step (A) when step (D) is implemented.

14. An apparatus for implementing non-reference frame prediction in video compression comprising:
- means for setting a prediction flag (i) off if non-reference frames are used for block prediction and (ii) on if non-reference frames are not used for block prediction;
- means for generating an output video signal in response to an input video signal by performing an inverse quantization step and an inverse transform step in accordance with a predefined coding specification, if said prediction flag is off; and
- means for bypassing said inverse quantization step and said inverse transform step, if said prediction flag is on.

15. The apparatus according to claim 14, wherein said output data stream comprises an H.264 compliant bitstream.

16. The method according to claim 1, wherein said prediction flag is generated in response to inter motion compensation processing.

17. The method according to claim 1, wherein said prediction flag is generated in response to intra prediction compensation processing.

18. The method according to claim 1, wherein said prediction flag is generated in response to (i) intra prediction compensation processing and (ii) inter motion compensation processing.

19. The method according to claim 1, wherein said prediction flag is implemented as a register bit set during encoding.

20. The method according to claim 19, wherein said register bit is included in an intermediate signal used to generate said output video signal.

* * * * *